US012704824B2

(12) United States Patent
Kubik et al.

(10) Patent No.: US 12,704,824 B2
(45) Date of Patent: Aug. 11, 2026

(54) WORKFLOW FOR EFFICIENT PARAMETERIZATION OF A NUMERICAL CONTROL

(71) Applicant: Siemens Aktiengesellschaft, Munich (DE)

(72) Inventors: Alexander Kubik, Erlangen (DE); Uwe Ladra, Erlangen (DE); Andreas Klotzek, Erlangen (DE); Preethy Krell, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 334 days.

(21) Appl. No.: 18/613,911

(22) Filed: Mar. 22, 2024

(65) Prior Publication Data

US 2024/0319701 A1 Sep. 26, 2024

(30) Foreign Application Priority Data

Mar. 24, 2023 (EP) .................................... 23164078

(51) Int. Cl.
*G05B 19/18* (2006.01)

(52) U.S. Cl.
CPC .. *G05B 19/182* (2013.01); *G05B 2219/49079* (2013.01)

(58) Field of Classification Search
None
See application file for complete search history.

(56) References Cited

U.S. PATENT DOCUMENTS 10,585,417 B2 * 3/2020 Takayama .......... G05B 19/4065

FOREIGN PATENT DOCUMENTS

| | | |
|---|---|---|
| EP | 3518051 A1 | 7/2019 |
| EP | 4130902 A1 | 2/2023 |

* cited by examiner

*Primary Examiner* — Carlos R Ortiz Rodriguez
(74) *Attorney, Agent, or Firm* — Henry M. Feiereisen LLC

(57) ABSTRACT

A computing facility transmits a command to a numerical control to briefly actuate a spindle drive, receives from the numerical control a drive torque applied to the spindle drive and data about a resulting acceleration of the spindle and determines therefrom a moment of inertia of the spindle and the spindle drive. The computing facility retrieves from the converter parameters describing the maximum possible operating limits of the converter and motor data of the drive motor, from which the maximum possible torque of the spindle drive can be determined as a function of the speed of the drive motor. The computing facility receives from an operator process data which include at least the process torque and determines required currents and torques and thermal losses in the spindle drive. The operator selects from the determined combinations, on the basis of which the limit values below a predetermined loss limit are determined.

11 Claims, 8 Drawing Sheets

9
8
7
6
1
4
13
10
3
2
5
Computing Facility
Numerical Control
12
11
2

T2'
T1
T2"
nA

T2'
T1
T2"
M2
M1
M2

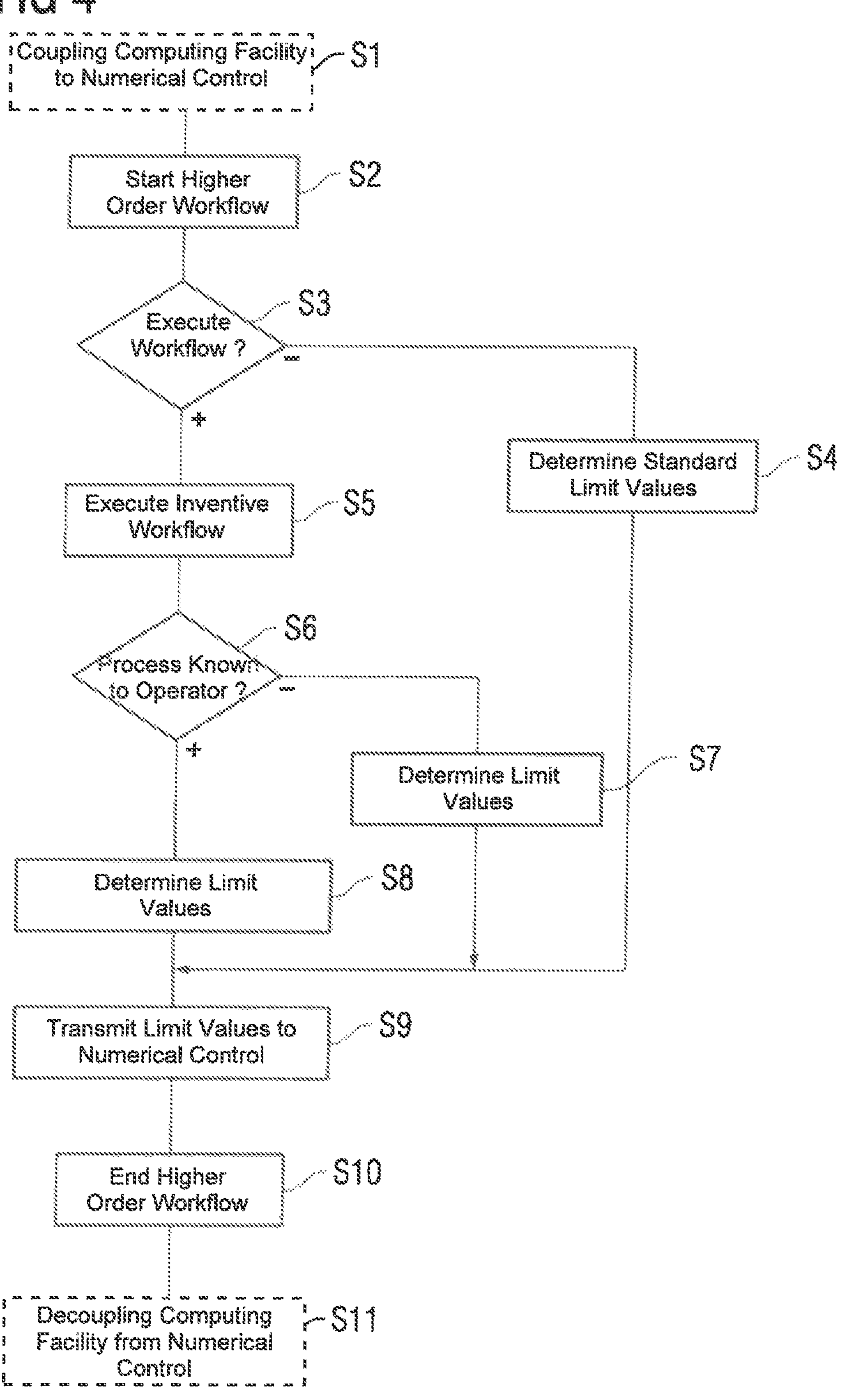
FIG 4
Coupling Computing Facility to Numerical Control
S1
Start Higher Order Workflow
S2
Execute Workflow ?
S3
-
+
Determine Standard Limit Values
S4
Execute Inventive Workflow
S5
Process Known to Operator ?
S6
-
+
Determine Limit Values
S7
Determine Limit Values
S8
Transmit Limit Values to Numerical Control
S9
End Higher Order Workflow
S10
Decoupling Computing Facility from Numerical Control
S11

Start Query Sequence
S21
Lathe or Milling Machine ?
S22
−
+
Inventive Limit Values Used ?
S23
−
+
Execute Inventive Workflow
S5
Determine Standard Limit Values
S4

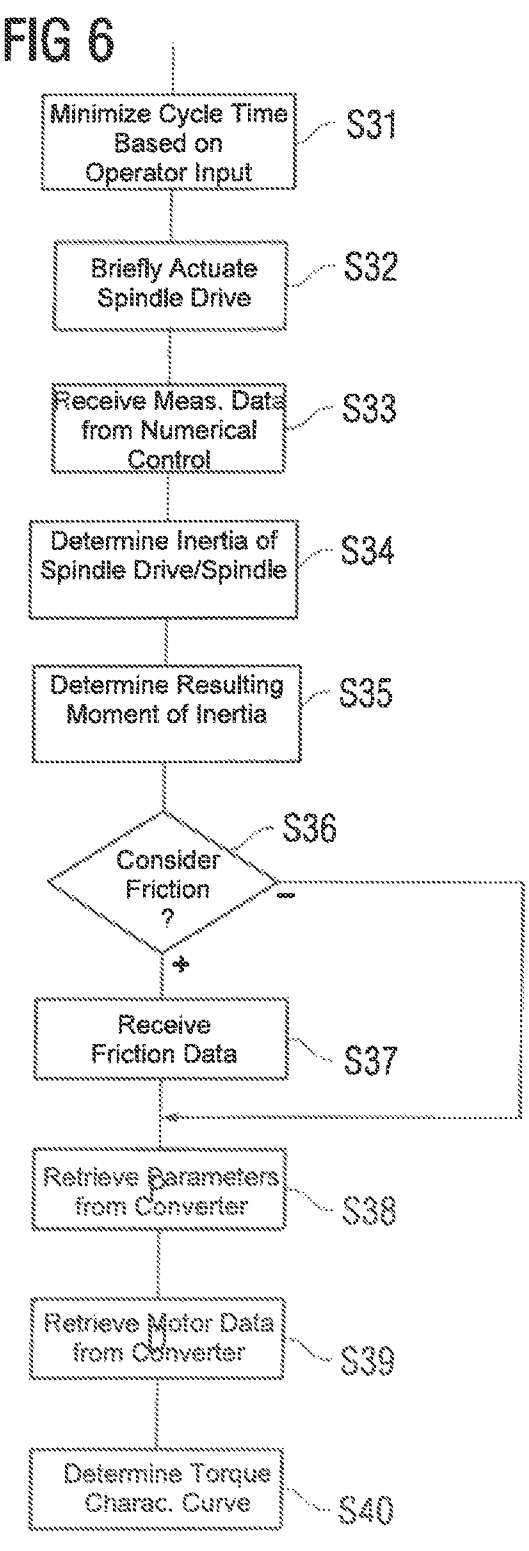
FIG 6
Minimize Cycle Time Based on Operator Input
S31
Briefly Actuate Spindle Drive
S32
Receive Meas. Data from Numerical Control
S33
Determine Inertia of Spindle Drive/Spindle
S34
Determine Resulting Moment of Inertia
S35
Consider Friction ?
S36
-
+
Receive Friction Data
S37
Retrieve Parameters from Converter
S38
Retrieve Motor Data from Converter
S39
Determine Torque Charac. Curve
S40

Determine Inertia of Spindle Drive/Spindle
S34
Receive Inertia Variables from Operator
S51
Specify Offset for Inertia Variables
S52
Determine Resulting Moment of Inertia
S35

Query the Operator for Friction Characteristics
S37

Initiate a Measuring Process in the Numerical Control
S61
Computing Facility receives Operating Data from the Numerical Control
S62
Computing Facility Determines Friction Characteristics
S63

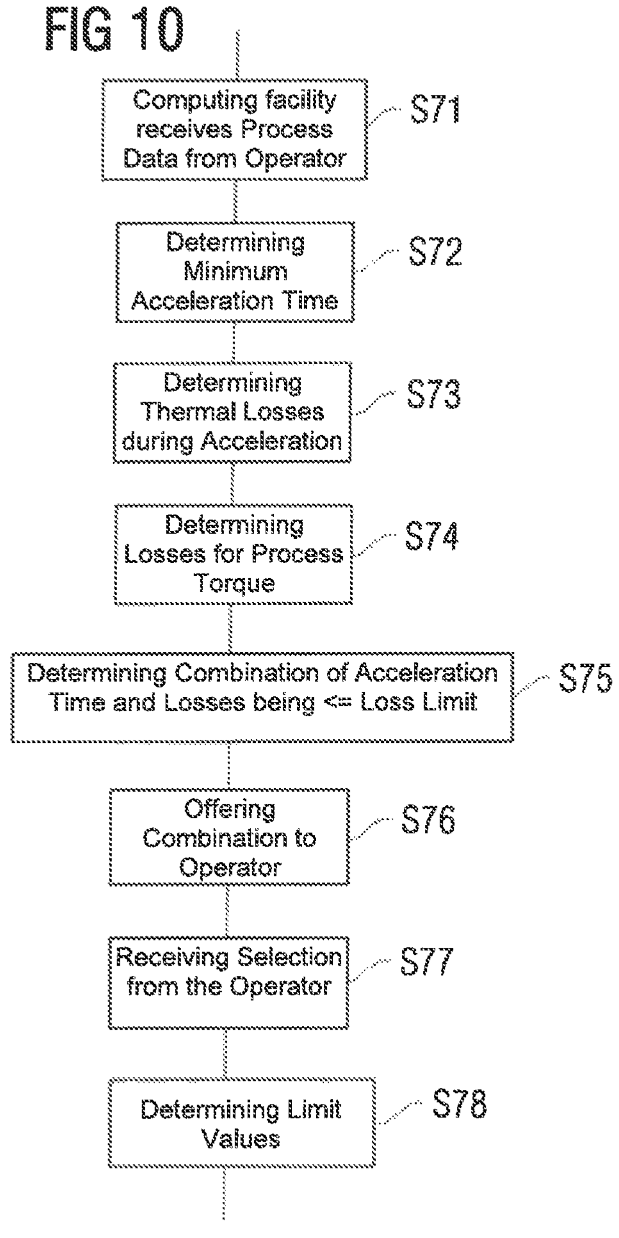
FIG 10
Computing facility receives Process Data from Operator
S71
Determining Minimum Acceleration Time
S72
Determining Thermal Losses during Acceleration
S73
Determining Losses for Process Torque
S74
Determining Combination of Acceleration Time and Losses being <= Loss Limit
S75
Offering Combination to Operator
S76
Receiving Selection from the Operator
S77
Determining Limit Values
S78

Receiving Process Data from the Operator
S81
Determining Ramp-Up Time
S82
Determining Thermal Losses during Ramp-Up Time
S83
Determining Losses around Process Torque
S84
Determining Combination of Ramp-Up Time and Losses being <= Loss Limit
S85
Offering Combination to Operator
S86
Receiving Selection from the Operator
S87
Determining Limit Values
S88

WORKFLOW FOR EFFICIENT PARAMETERIZATION OF A NUMERICAL CONTROL

CROSS-REFERENCES TO RELATED APPLICATIONS

This application claims the priority of European Patent Application, Ser. No. 23/164,078.0, filed Mar. 24, 2023, pursuant to 35 U.S.C. 119(a)-(d), the content of which is incorporated herein by reference in its entirety as if fully set forth herein.

BACKGROUND OF THE INVENTION

The present invention relates to a method for parameterizing a numerical control of a machine tool, to a computer program having machine code to be processed by a computing facility coupled to the numerical control, and to a computing facility coupled to the numerical control and programmed with the aforementioned computer program.

With the method, in normal operation, during a respective acceleration time, the numerical control iteratively accelerates a spindle of a machine tool controlled by the numerical control by means of a spindle drive and during a respective machining time, machines a workpiece by means of a respective tool held in the spindle, wherein during the respective machining time, the spindle drive rotates the tool at an operating speed and applies to it a respective process torque. The spindle drive has a drive motor, which is supplied with current via a converter of the spindle drive, with the spindle drive generating a torque.

Certain assumptions about the load cycles of the spindle drive are already usually made in connection with the selection of the spindle drive and the associated drive motor. As a rule, the focus is on the necessary process torque, the torque that occurs and is required during machining therefore. It is therefore primarily a matter of being able to provide the necessary power for the machining process.

There are further demands on the operation of the spindle drive, however. Thus, for example for some applications and cutting qualities, very high speeds of the spindle drive are necessary, for example when work is to be done at a high feed rate in order to increase the productivity of the machine tool, or because high surface finishes have to be achieved. In such cases, it is not just the process torque that is important for the achievable productivity, but also the acceleration time which is necessary until the spindle drive has ramped up to the appropriate speed (the operating speed therefore). Such acceleration times are often only considered to a lesser degree when designing the spindle drive and the associated drive motor. In some cases, the acceleration time only comprises the ramp-up time, that time which is necessary for accelerating the spindle to the operating speed (usually from a standstill) therefore. The acceleration time can, however, optionally also comprise the braking time which is necessary for decelerating (=negative acceleration) the spindle (usually to a standstill).

Different items of information have to be merged in order to nevertheless be able to implement an appropriate optimization. Firstly, the data sheet of the manufacturer of the motor has to be interpreted for the drive motor being used. Furthermore, it has to be determined which electrical boundary conditions exist on the electrical equipment, in particular which possibilities the converter makes available. The friction characteristic curve (=friction as a function of the speed) for the spindle shaft has to be calculated or determined using measurements. The machine tool has to be programmed such that a ramp-up attempt can be carried out. The machine tool has to be prepared for the ramp-up attempt. By way of example, the spindle has to be warmed up and the lubrication of the spindle has to be checked. The ramp-up attempt has to be carried out. The period up until the operating speed is reached has to be acquired. Furthermore, it has to be checked whether the ramp-up of the spindle and the machining process can be carried out without overheating. Optionally, the ramp-up of the spindle has to be limited to an admissible value. Actions of this kind necessitate specialist knowledge and are only carried out by experts in the prior art therefore.

It would therefore be desirable and advantageous to create possibilities by which the cycle time, i.e. the sum of acceleration time and machining time, and thus the productivity of the machine tool can be optimized also by other operators.

SUMMARY OF THE INVENTION

According to one aspect of the invention, a parameterization method includes before implementation of normal operation, observing with the numerical control and with the spindle drive during the course of a workflow limit values in a computing facility coupled to the numerical control and transmitting the limit values by the computing facility to the numerical control and the converter and during the course of processing of the workflow, the computing facility transmits a command to the numerical control to briefly actuate the spindle drive, during the brief actuation, receives from the numerical control a loading of the spindle drive with a drive torque and data about an acceleration of the spindle prompted during the brief actuation and by considering this data, determines a moment of inertia of the spindle, including the spindle drive, retrieves parameters directly or via the numerical control from the converter of the spindle drive, which parameters describe the maximum possible operating limits of the converter, retrieves motor data of the drive motor of the spindle drive directly or via the numerical control from the converter of the spindle drive, from which data the maximum possible torque of the spindle drive can be determined as a function of the speed of the drive motor, receives process data from an operator, wherein the process data comprises at least the process torque, by considering the operating speed, a resulting moment of inertia determined by considering the moment of inertia of the spindle, including the spindle drive, the parameters retrieved from the converter and the motor data retrieved from the converter and the process data for possible acceleration times, determines the associated necessary currents and torques and the thermal losses that occur in the spindle drive in this connection and determines the thermal losses that occur in the spindle drive in this connection for possible process torques, determines combinations of acceleration times, process torques and machining times at which the mean thermal losses do not overshoot a predetermined loss limit, offers the operator the determined combinations of acceleration times, process torques and machining times for selection and receives a selection of such a combination from the operator and on the basis of the selection of the operator, determines the limit values to be observed by the numerical control and the spindle drive.

The command to briefly actuate the spindle drive is known as such. The associated loading of the spindle drive and the acquisition of the corresponding data of the spindle are also known as such. In particular, procedures of this kind are known in the context of what is known as Auto Servo Tuning. Building on this, determining the moment of inertia of the spindle (including the spindle drive) necessitates only knowledge of the active torque and the resulting acceleration of the spindle.

The parameters, which the computing facility retrieves from the converter of the spindle drive, define—at least partially—which current and which power the converter can supply to the drive motor and with which—as a rule, speed-dependent—torque the drive motor can load the spindle. The parameters can be determined as required, moreover. As a rule, the parameters comprise the current limit of the semiconductor switches, the power limit of the converter, the torque limit of the spindle drive, the torque limit of the spindle and/or the conversion factor by means of which a motor current fed into the spindle drive by the converter can be converted into a torque acting in the spindle drive.

The motor data, which the computing facility retrieves from the converter of the spindle drive, can, if it permits the desired determination, similarly be determined if required. Often the motor data of the drive motor of the spindle drive comprises the type of motor, the nominal speed and/or the design torque of the drive motor.

The type of motor defines, in particular, whether the drive motor is a synchronous machine or an asynchronous machine, etc. The nominal speed is that speed at which the drive motor reaches its nominal power. The design torque is that torque up to which the drive motor can be loaded without sustaining damage.

In addition to the process torque, the process data can comprise further data. This is not imperative, however.

On the basis of the items of information, which are now available to the computing facility, the parameters, the motor data and the process data as well as the desired operating speed and the resulting moment of inertia therefore, the computing facility can therefore determine the thermal losses that occur in the spindle drive in particular modes of operation. It is thereby also possible to determine admissible combinations of acceleration times, process torques and machining times, in other words of combinations at which the mean thermal losses do not overshoot a predetermined loss limit therefore. The computing facility can thus offer these combinations to the operator for selection. The limit values to be observed by the numerical control and the spindle drive can then be determined on the basis of the operator's selection.

The limit values to be observed by the numerical control and the spindle drive can comprise, in particular, the maximum current and power which the converter supplies to the drive motor. Alternatively or in addition, the limit values to be observed by the numerical control and the spindle drive can comprise the maximum torque applied by the spindle drive and a maximum acceleration of the spindle drive.

In the simplest case, a friction that occurs in the spindle can be ignored. Alternatively, appropriate consideration is possible. In this case, the computing facility considers the friction that occurs in the spindle during the course of determining the possible acceleration times. When considering the friction that occurs, it is not a matter—at least as a rule—of thermal effects prompted by the friction as such, however, but the (adverse) effect of the friction on the acceleration. In the context of the process torque, as a rule, it is not necessary to consider the friction since the friction is already included in the necessary process torque as such. Optionally, an additional consideration can also be made here, however.

Various procedures are possible for defining the characteristics of the friction that occurs in the spindle. Firstly, the characteristics of the computing facility can be specified by the operator. Alternatively it is possible that the computing facility determines the characteristics of the friction that occurs in the spindle on the basis of metrologically acquired operating data of the spindle.

Preferably, the computing facility receives inertia-relevant variables from the operator, which, in addition to the moment of inertia of the spindle, including the spindle drive, the computing facility considers when determining the resulting moment of inertia. The additional variables can be, in particular, a moment of inertia of a tool and/or an offset provided for safety.

Depending on the extent to which the machining process is known to the operator, it is possible that, in addition to the process torque, the process data also comprises the machining time. In this case, the computing facility determines, preferably for values around the process torque and/or the machining time, the respectively achievable acceleration time and outputs it to the operator.

Alternatively it is possible that the machining process is substantially unknown to the operator. In this case, the process data does not comprise the machining time. In this case, the computing facility determines the minimum possible acceleration time and for the minimum possible acceleration time, the minimum necessary machining time as a function of the process torque that occurs or, conversely, the maximum admissible process torque as a function of the machining time, and outputs these pairs of values to the operator.

According to another aspect of the invention, a computer program having machine code stored on a non-volatile computer-readable medium, which when read into a memory of a computing facility coupled to a numerical control and executed by a processor of the computing facility, causes the numerical control to carry out the aforedescribed parameterization method.

According to yet another aspect of the invention, a computing facility is programmed with the aforedescribed computer program, so in operation the computing facility carries out the inventive parameterization method.

Further embodiments of the invention are recited in the dependent claims.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows a flowchart illustrating a workflow, FIG. 6 illustrates selection of a step of the workflow of FIG. 4, FIG. 10 illustrates an alternative embodiment of a step of the workflow of FIG. 5.

DETAILED DESCRIPTION OF PREFERRED EMBODIMENTS

Figure 1:
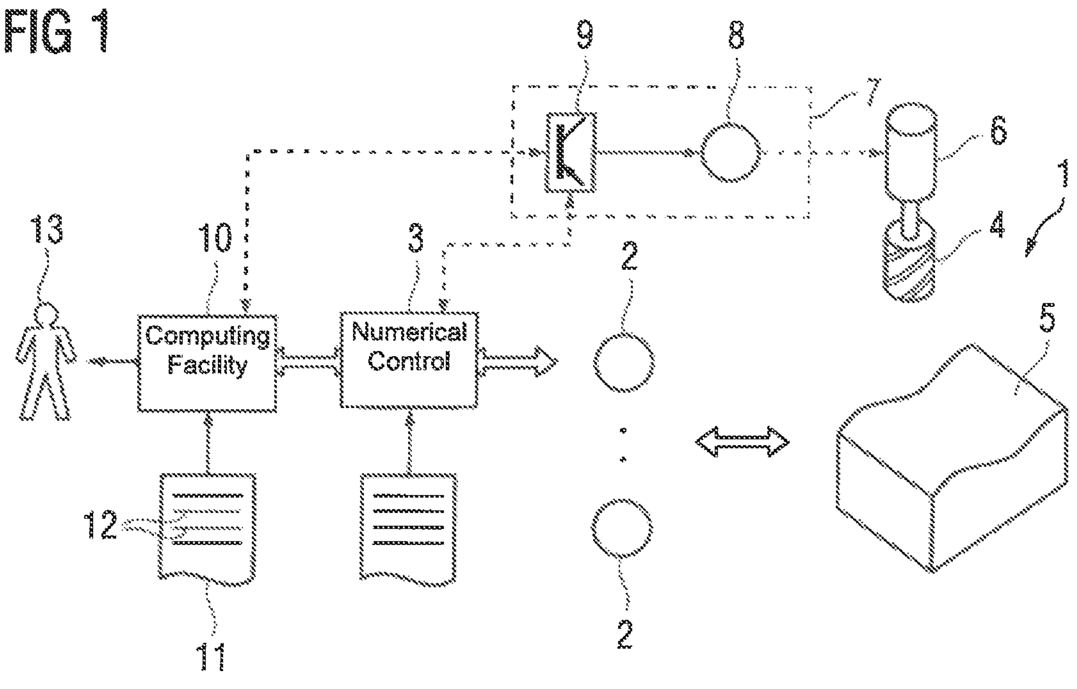
FIG. 1 shows a machine tool, a numerical control and a computing facility.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

According to FIG. 1, a machine tool 1 has a number of position-controlled shafts 2. As a rule, a plurality of position-controlled shafts 2 is present. This is not necessary in all case, however. The position-controlled shafts 2 are controlled by a numerical control 3. In normal operation, the numerical control 3 actuates the position-controlled shafts 2, in the case of a plurality of position-controlled shafts 2, in a coordinated manner accordingly. The associated parts program is indicated in FIG. 1 but is not provided with a reference numeral. A tool 4 of the machine tool 1 (for example, a milling cutter) is moved along a path relative to a workpiece 5 by the actuation of the position-controlled shafts 2. The tool 4 is held in a spindle 6. The spindle 6 has a spindle drive 7 by means of which the spindle 6 is rotated. The spindle drive 7 has a drive motor 8 which is supplied with current via a converter 9. The spindle drive 7 generates a torque due to the drive motor 8 being supplied with current.

Normal operation is that operation of the numerical control during which the workpiece is machined. Normal operation therefore represents productive operation.

Figure 2:
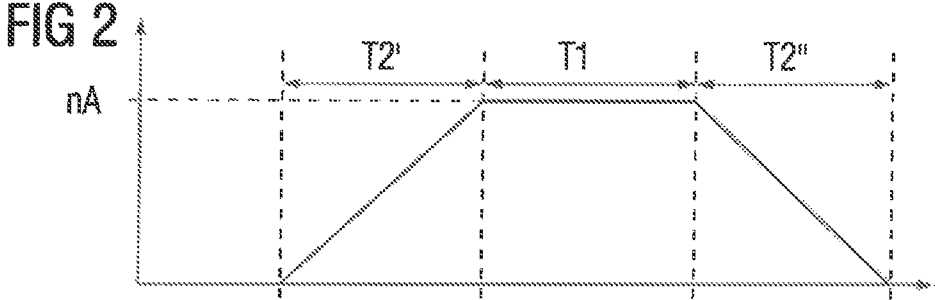
FIG. 2 shows a time graph illustrating intermittent machining of a workpiece.
Figure 3:
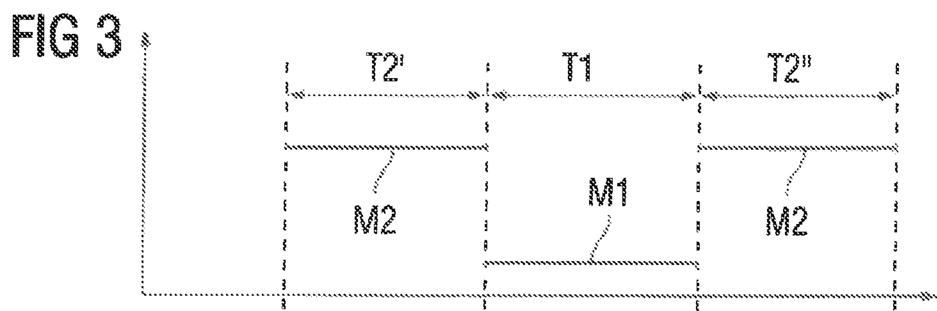
FIG. 3 shows a time graph illustrating loading of a spindle with a process torque.

The workpiece 5 is machined intermittently according to FIG. 2. In particular, phases of machining alternate with phases of non-machining. The respective machining phase has a respective machining time T1. During a respective machining phase, the spindle 6 rotates the tool 4. In this connection the spindle drive 7 loads the spindle 6 according to FIG. 3 with a respective process torque M1. Before the respective machining, the spindle drive 7 accelerates the spindle 6—usually starting from a standstill, speed=0 therefore—to an operating speed nA. The associated ramp-up phase has a ramp-up time T2'. An acceleration torque M2 is active for acceleration. The spindle 6 and the spindle drive 7 are also actuated by the numerical control 3. The operating speed nA can be fixed or can be specified to the numerical control 3, for example during the course of the workflow explained below, or in a different manner. After the machining phase, deceleration, usually to a standstill, to speed=0 therefore, occurs in a braking phase. A braking time T2" is required for deceleration.

The sequence of ramp-up phase, machining phase and braking phase is iteratively implemented. Often the tool 4 is changed between deceleration and ramp-up. The machining phases are therefore often carried out with one dedicated tool 4 respectively. The machining times T1 can sometimes vary from machining phase to machining phase. Where the machining time T1 is referred to below, the minimum value of the machining times T1 is meant. Analogously, the process torque M1 can also vary and, more precisely, both within the respective machining phase as well as from machining phase to machining phase. Where the process torque M1 is referred to below, the maximum value of the process torque M1 is meant.

The ramp-up time T2' is substantially determined by the torque with which the spindle 6 is loaded during the ramp-up time T2', the acceleration torque M2 therefore. The acceleration torque M2 can be constant or can vary. As a rule, the acceleration torque M2 is always selected to be as high as is only just possible owing to the circumstances of operation of the spindle drive 7, however. The same applies to deceleration during the braking time T2". As a rule, the associated braking torque has the same value as the acceleration torque M2. Hereinafter the reference numeral M2 will be used therefore for the braking torque or, in general, only the acceleration torque M2 will be referred to.

An acceleration time T2 is directly coupled to the acceleration torque M2. In some cases, the acceleration time T2 comprises only the ramp-up time T2'. Optionally, the acceleration time T2 can also comprise the braking time T2, however, the sum of ramp-up time T2' and braking time T2" therefore.

The acceleration torque M2 is directly coupled to a maximum acceleration aM at which the spindle 6 can be operated. The maximum acceleration aM in turn influences the ramp-up time T2' and the braking time T2" and therewith in each case, the acceleration time T2. The acceleration torque M2 is for its part dependent on limit values IM, PM, MM, aM, which are observed by the numerical control 3 and the spindle drive 7 and here, in particular, by the converter 9. Determining these limit values IM, PM, MM, aM is the essence of the present invention.

The limit values IM, PM, MM, aM are determined in a computing facility 10. The computing facility 10 is coupled for this purpose at least to the numerical control 3. Optionally, the computing facility 10, as is indicated in broken lines in FIG. 1, can also be coupled to the converter 9. If the computing facility 10 is not directly coupled to the converter 9, it is indirectly coupled via the numerical control 3. This is also indicated in broken lines in FIG. 1. The computing facility 10 is programmed with a computer program 11. The computer program 11 comprises machine code 12, which can be processed by the computing facility 10. The computing facility 10 carries out a parameterization method on the basis of the programming of the computing facility 10 with the computer program 11 or the processing of the machine code 12 by the computing facility 10. The parameterization method and the associated workflow will be explained in more detail below in connection with FIG. 4 and the further figures.

According to FIG. 4, the computing facility 10 is firstly coupled in a step S1 to the numerical control 3 and optionally also to the converter 9. As a rule, the coupling is not implemented solely by the computing facility 10, but at least partially by an operator 13 (see FIG. 1). Step S1 is therefore represented only in broken lines in FIG. 4.

A higher-order workflow is started in a step S2. The workflow can alternatively be started independently by the computing facility 10 or on the basis of an input by the operator 13. The higher-order workflow comprises the inventive portion of the workflow, but also comprises further facts.

In a step S3, the computing facility 10 decides on the basis of inputs by the operator 13 whether the inventive workflow should be executed or not. One possible implementation of step S3 will be explained in connection with FIG. 5.

If the inventive workflow is not to be executed, the computing facility 10 migrates to step S4. In step S4, the computing facility 10 determines standard values for the limit values IM, PM, MM, aM to be observed. As a rule, the standard values are based on the assumption of what is known as S1 operation of the spindle drive 7, the permanent operation of the spindle drive 7 (continuous load) therefore. Step S4 can be implemented in a manner known per se. As such it is not a subject matter of the present invention. For the sake of good order, explicit reference should be made to the fact that, despite the designation “S1”, S1 operation of the spindle drive 7 does not correspond to step S1 of the workflow.

If the inventive workflow is to be executed, the computing facility 10 executes operations in step S5, which are executed during the course of the inventive workflow in any case. Step S5 will be explained in connection with FIG. 6. In a step S6, the computing facility 10 queries the operator 13 as to whether the machining process, to which the ramp-up time T2' should be matched, is a machining process known to the operator 13. In the case of an unknown machining process, the computing facility 10 migrates to step S7; in the case of a known machining process, to step S8. Steps S7 and S8 will be explained in connection with FIGS. 10 and 11. In steps S5 to S8, the limit values IM, PM, MM, aM to be observed are determined on an individualized basis. Steps S5 to S8 represent the essence of the present invention.

Starting from step S4 as well as from steps S7 and S8, the computing facility 10 migrates to step S9. In step S9, the computing facility 10 transmits the values determined in one of steps S4, S7 and S8 as limit values IM, PM, MM, aM to be observed during operation of the numerical control 3 to the numerical control 3 and optionally also to the converter 9.

In a subsequent step S10, the computing facility 10 ends the workflow. The parameterization method is concluded with the execution of step S10. In a step S11, the computing facility 10 is merely decoupled at least from the numerical control 3 and optionally also the converter 9. As a rule, decoupling is not implemented solely by the computing facility 10 but at least partially by the operator 13. Step S11 is therefore represented only in broken lines, analogously to step S1 in FIG. 4.

One possible embodiment of step S3 of FIG. 4 will be explained in more detail below in connection with FIG. 5.

Figure 5:
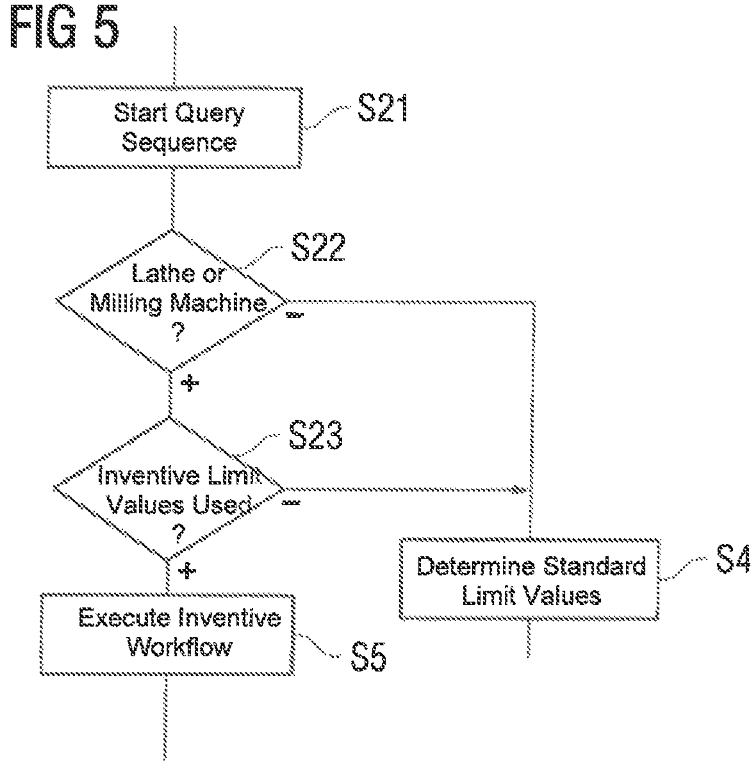
FIG. 5 illustrates a particular step of the workflow of FIG. 4.

According to FIG. 5, the computing facility 10 starts a query sequence in a step S21. During the course of the query sequence, the computing facility 10 firstly queries the operator 13 in a step S22 as to whether the machine tool 3 is a lathe or milling machine. If the operator 13 of the computing facility 10 provides a confirmation, the computing facility 10 then queries the operator 13 in a step S23 as to whether the limit values IM, PM, MM, aM to be observed should be specifically (=inventively) determined. If the operator 13 confirms this too, the computing facility 10 migrates to step S5 (cf. also FIG. 4). If, on the other hand, the operator 13 of the computing facility 10 does not provide a corresponding confirmation in step S22 or step S23, the computing facility 10 migrates to step S4 (cf. also FIG. 4). The query of step S23 can comprise, for example, whether the machine tool is to be used in mold-making and/or whether fine contours and high productivity are desired.

One possible embodiment of step S5 in FIG. 4 will be explained in more detail below in connection with FIG. 6.

According to FIG. 6, the computing facility 10 selects in a step S31 on the basis of an input by the operator 13, the goal of the workflow, namely minimizing the cycle time (which is the sum of machining time T1 and acceleration time T2). For this purpose, what is known as S6 operation of the spindle drive 7 is selected, alternating operation with high-load phases and recovery phases therefore. The high-load phases correspond to the ramp-up phases and/or the braking phases, the recovery phases to the machining phases. For the sake of good order, explicit reference is made to the fact that, despite the designation “S6”, S6 operation of the spindle drive 7 does not correspond to step S6 of the workflow. The situation is analogous to the relationship between S1 operation of the spindle drive 7 and step S1.

In a step S32, the computing facility 10 transmits a command to the numerical control 3 to (briefly) actuate the spindle drive 7, so the spindle drive 7 is loaded with a drive torque.

In a step S33, the computing facility 10 receives measurement data from the numerical control 3. The measurement data is acquired by the numerical control 3 during the brief actuation. The measurement data is determined in such a way that it is possible to determine from it the acceleration of the spindle 6 prompted during the brief actuation. The measurement data can comprise the rotational position or the speed (or characteristic data for it) as a function of the time. Optionally, it can additionally comprise, for example, the torque (or characteristic data for it) generated by the drive motor 8.

The implementation of steps S32 and S33 as such are known to experts.

In a step S34, by considering the measurement data, the computing facility 10 then determines a moment of inertia Θ of the spindle 6, including the spindle drive 7. In particular, the computing facility 10—either a priori or on the basis of the measurement data—also knows the torque generated by the drive motor 8, so the moment of inertia Θ can be readily determined in connection with the prompted acceleration (the prompted acceleration can be determined from the measurement data).

In a step S35, the computing facility 10 determines a resulting moment of inertia ΘR. The resulting moment of inertia ΘR depends on the moment of inertia Θ determined in step S34. In the simplest case, the resulting moment of inertia ΘR is identical to the moment of inertia Θ determined in step S34. It is also possible, however, to determine a different value. This will be explained later in connection with FIG. 7.

In a step S36, the computing facility 10 queries the operator 13 as to whether the friction that occurs should be explicitly considered. If this is case, the computing facility 10 receives corresponding friction data a step S37. Otherwise, step S37 is skipped. Possible embodiments of step S37 will be explained in connection with FIGS. 8 and 9.

In a step S38, the computing facility 10 retrieves parameters P from the converter 9 of the spindle drive 7, which parameters describe the maximum possible operating limits of the converter 9. The parameters P can be retrieved directly from the converter 9 if there is a corresponding coupling of the computing facility 10 to the converter 9. Alternatively, the parameters can be retrieved indirectly via the numerical control 3.

The parameters P, which the computing facility 10 retrieves from the converter 9, as a rule comprise one, a plurality of or all of the following values:

- the current limit of the semiconductor switches of the converter 9, the maximum current which the semiconductor switches can supply therefore,
- the power limit of the converter 9, the maximum power which the converter 9 can supply to the drive motor 8 or which the spindle 6 can cope with therefore,
- the torque limit of the spindle drive 7, the maximum torque which the spindle drive 7 can generate therefore,
- the torque limit of the spindle 6, the maximum torque with which the spindle 6 may be supplied by the spindle drive 7 therefore, and
- the conversion factor by means of which a motor current fed into the spindle drive 7 by the converter 9 can be converted into a torque acting in the spindle drive 7.

In a step S39, the computing facility 10 retrieves motor data D from the converter 9 of the spindle drive 7, from which data the maximum possible torque of the spindle drive 7 can be determined as a function of the speed of the drive motor 8. Analogously to the procedure with the parameters P, the motor data can alternatively be directly retrieved from the converter 9 or indirectly via the numerical control 3.

The motor data D, which the computing facility 10 retrieves from the converter 9, as a rule comprises one, a plurality of or all of the following values:

- the type of motor, for example whether it is a synchronous machine or an asynchronous machine therefore,
- the nominal speed, that speed up to which the drive motor 8 can be operated with its design torque therefore (higher speeds are either not possible or the torque has to be reduced [field weakening operation]), and
- the design torque of the drive motor 8, that is to say the maximum torque which can be generated by the drive motor 8 (the drive motor 8 would be damaged or destroyed at a higher torque).

In a step S40, the computing facility 10 determines a torque characteristic curve for the drive motor 8. It therefore determines the maximum possible torque as a function of the speed. The torque is determined using the parameters P and the motor data D. The implementation of step S40 is known as such to experts.

One possible embodiment of step S35 in FIG. 6 will be explained below in connection with FIG. 7.

Figure 7:
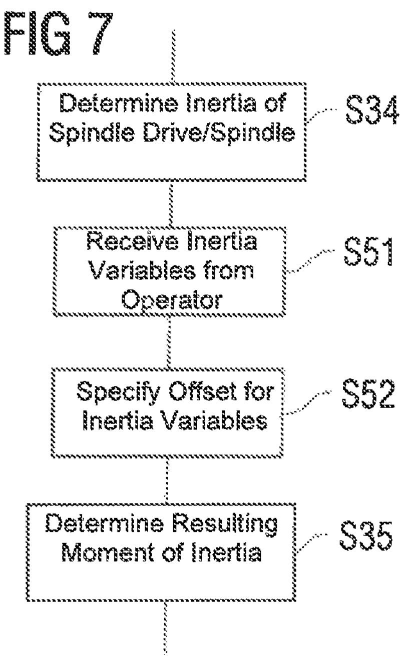
FIG. 7 illustrates a particular step of the workflow of FIG. 6.

According to FIG. 7, a step S51 and/or a step S52 are present in addition to steps S34 and S35. In steps S51 and S52, the computing facility 10 receives inertia-relevant variables from the operator 13. The computing facility 10 considers these variables, in addition to the moment of inertia Θ determined in step S34, when determining the resulting moment of inertia ΘR. By way of example, a moment of inertia of the tool 4 can be specified in step S51. Here, as a rule, the largest moment of inertia is specified in the case of a plurality of possible tools. In step S52, a (freely selectable) offset can be specified, a kind of reserve as it were for all cases. The resulting moment of inertia ΘR is produced by the sum of the moment of inertia Θ determined in step S34 and the values specified in steps S51 and S52.

Figure 8:
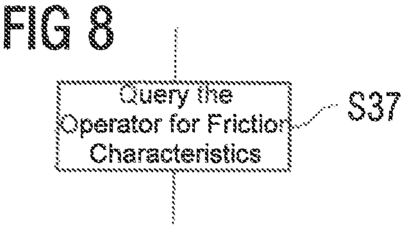
FIG. 8 illustrates a particular embodiment of a step of the workflow of FIG. 6.

One possible embodiment of step S37 will be explained below in connection with FIG. 8. According to FIG. 8, step S37 is implemented by a querying of the operator 13. According to the embodiment in FIG. 8, characteristics are specified to the computing facility 10 by the operator 13 therefore, which characteristics are characteristic of the friction that occurs in the spindle 6.

Figure 9:
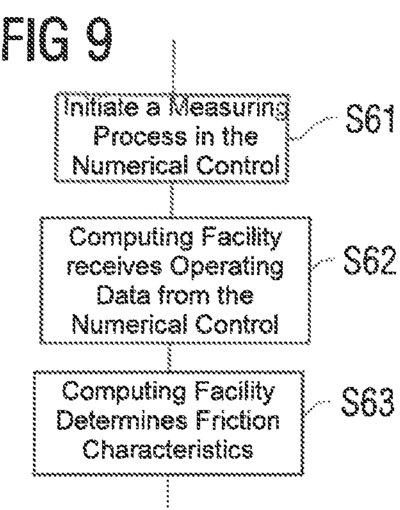
FIG. 9 illustrates an alternative embodiment of a step of the workflow of FIG. 6.

An alternative possible embodiment of step S37 will be explained below in connection with FIG. 9. According to FIG. 9, step S37 is implemented in the form of steps S61 to S63.

In step S61, the computing facility 10 initiates a measuring process in the numerical control 3 for metrologically acquiring operating data of the spindle 6. The operating data is determined in such a way that characteristics, which are characteristic of the friction that occurs in the spindle 6, can be determined on the basis of the operating data. In step S62, the computing facility 10 receives the operating data from the numerical control 3. In step S63, the computing facility 10 determines the characteristics for the friction.

Steps S61 to S63 can be implemented, for example, in such a way that a rotation of the spindle drive 7 at a particular speed is initiated and the torque, which is required to maintain this speed, is acquired. Since in the case of complete absence of friction, the torque for maintaining a particular speed is 0, the necessary torque muss trace back to the friction. This procedure can optionally be repeated for a plurality of speeds. Other possibilities are also given for determining the friction.

One possible embodiment of step S7 in FIG. 5 will be explained below in connection with FIG. 10.

According to FIG. 10, the computing facility 10 receives process data PD from the operator 13 in a step S71. The process data PD comprises the process torque M1, within the meaning of the present invention the maximum value of the process torques M1 that occurs therefore. Owing to the fact that the procedure in FIG. 10 presupposes that the machining process is not known, as a rule no further data is specified in step S71. In particular, the process data PD does not comprise the machining time T1. It is possible that the operating speed nA is also specified in step S71, however.

In a step S72, the computing facility 10 determines the minimum possible acceleration time T2 and the associated necessary currents (which the converter 9 supplies to the drive motor 8) and torques (which the drive motor 8 generates).

Strictly speaking, the computing facility 10 initially sets the current to its maximum value (=current limit of the converter 9). The computing facility 10 then checks whether the other boundary conditions of the converter 9, in particular its power limit, are being observed. The computing facility 10 then determines the associated generated torque. This determination includes the conversion factor in particular. The computing facility 10 then checks whether the torque limit of the spindle drive 7 and the torque limit of the spindle 6 as well as the design torque of the drive motor 8 are being observed.

If all limits are being observed, it is assumed that the spindle drive 7 is being operated with the maximum possible current. If this is not the case, the current is reduced until all limits are being observed.

In this way, as a rule starting from speed=0, the ramp-up of the spindle 6 is iteratively simulated in small time steps with respective adjustment of the speed achieved until the operating speed nA is reached. The resulting moment of inertia ΘR of the respective time step and—if considered—the friction that occurs in the spindle 6 are included in the change of speed from time step to time step. The friction therefore has, if it is considered, effects on the possible ramp-up time T2'. The computing facility 10 can analogously also determine the braking time T2".

In a step S73, the computing facility 10 determines the thermal losses V2 that occur during the determined acceleration time T2. It is often sufficient to consider only the copper losses in the winding of the drive motor 8. The iron losses can optionally also be considered too. The losses that occur in the converter 9 can optionally also be determined in a separate calculation.

Steps S72 and S73 can optionally be repeated while limiting the current to values below the current limit, so the respectively associated acceleration time T2 can be determined for certain maximum currents.

In a step S74, the computing facility 10 determines the associated losses V1 for the process torque M1. The conversion factor, possibly the type of motor and possibly the operating speed nA are included in the determination of the losses V1. If the process torque M1 still does not consider the friction, it can optionally also be considered. Step S74 is executed not only for the process torque M1 specified in step S71 but also for some values around it, above and/or below it. As a result, the associated losses V1 respectively can be determined for a plurality of process torques M1.

In a step S75, the computing facility 10 determines combinations of acceleration times T2, process torques M1 and machining times T1 whose mean thermal losses VM do not overshoot a predetermined loss limit VG. In particular, the respective mean thermal loss VM for a particular acceleration time T2, results in the associated thermal loss V2, a particular process torque M1, the associated thermal loss V1 and a particular machining time T1:

$$VM=(T1V1+T2V2)/(T1+T2)$$

In this connection—with a defined maximum current—the acceleration time T2 is defined, because it is determined to be as small as possible. The associated thermal losses V2 result by way of the corresponding operation of the spindle drive 7 and are similarly defined therefore. The thermal losses V1 are determined by the process torque M1 (optionally plus friction) and are similarly defined therefore. There thus remains just a single variable which can still be varied, namely the machining time T1. The computing facility 10 can therefore determine the minimum necessary machining time T1 respectively for the variously set process torques M1, the minimum necessary machining time T1 therefore, as a function of the process torque M1 that occurs. Alternatively it is also possible to determine the maximum possible process torque M1 respectively for variously set machining times T1, the maximum possible process torque M1 therefore, as a function of the machining time T1.

In a step S76, the computing facility 10 offers the determined combinations of acceleration times T2, process torques M1 and machining times T1—the admissible combinations therefore—to the operator 13 for selection. In a step S77, the computing facility 10 receives a selection of such a combination from the operator 13. In a step S78, the computing facility 10 then determines, on the basis of the selection of the operator 13, the limit values IM, PM, MM, aM to be observed. The determined limit values IM, PM, MM, aM can comprise, in particular, the maximum current IM and the maximum power PM which the converter 9 supplies to the drive motor 8. Alternatively or in addition, the limit values to be observed by the numerical control 3 and the spindle drive 7 can comprise the maximum torque MM applied by the spindle drive 7 and a maximum acceleration aM of the spindle drive 7.

One possible embodiment of step S8 in FIG. 5 will be explained below in connection with FIG. 11.

Figure 11:
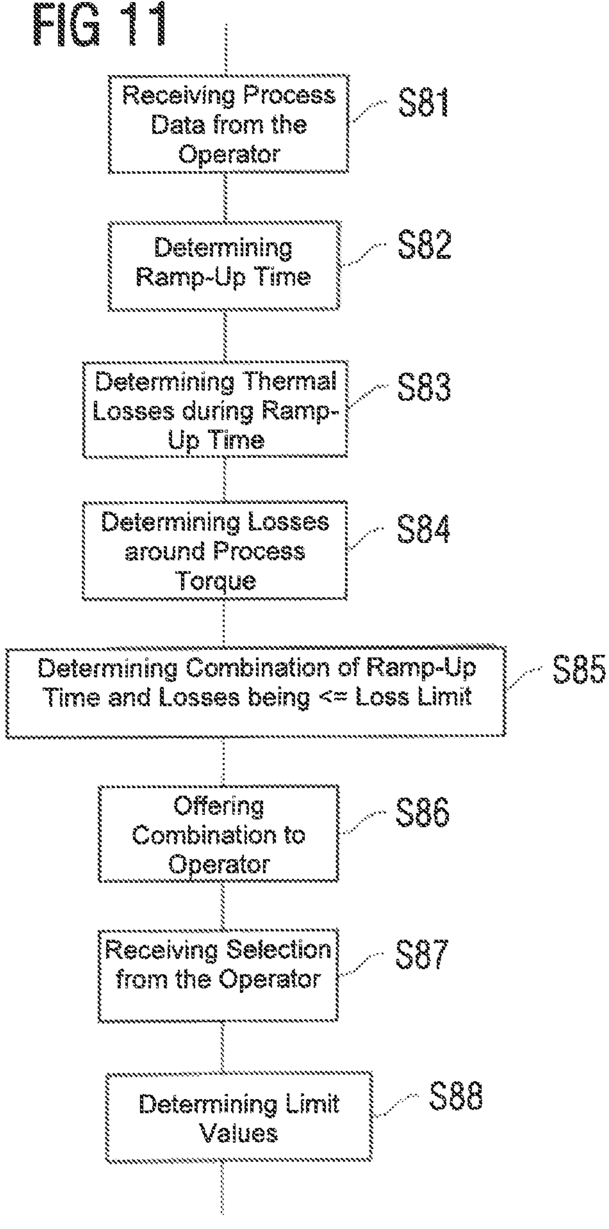
FIG. 11 illustrates another embodiment of a step of the workflow of FIG. 5.

According to FIG. 11, the computing facility 10 receives the process data PD from the operator 13 in a step S81. Step S81 in FIG. 11 corresponds in terms of content to step S71 in FIG. 10. Owing to the fact that the procedure in FIG. 11 presuppose that the machining process is known, the machining time T1 can also be specified in step S81 too, however.

In a step S82, the computing facility 10 determines a possible ramp-up time T2' and the associated necessary currents (which the converter 9 supplies to the drive motor 8) and torques (which the drive motor 8 generates) for a particular maximum current. In essence, step S82 in FIG. 11 corresponds to step S72 in FIG. 10. The difference consists merely in that it is not necessarily the maximum value which is set for the admissible current.

In a step S83, the computing facility 10 determines the thermal losses V2 that occur during the determined ramp-up time T2'. Step S83 in FIG. 11 corresponds in terms of content to step S73 in FIG. 10.

Steps S82 and S83 are repeated while limiting the current to mutually different values below the current limit.

In a step S84, the computing facility 10 determines the associated losses V1 respectively for the process torque M1 and some values around it, above and/or below it. Step S84 in FIG. 11 corresponds in terms of content to step S74 in FIG. 10.

In a step S85, the computing facility 10 determines combinations of acceleration times T2, process torques M1 and machining times T1 whose mean thermal losses VM do not overshoot a predetermined loss limit VG. In particular, the respective mean thermal loss VM results in the same manner as already explained for FIG. 10. In contrast to the procedure in FIG. 10, in FIG. 11 the acceleration time T2 is not defined, however. Instead, the machining time T1 is defined because it is specified in step S81. Strictly speaking, a single value could thus be determined during the course of step S85, namely the achievable acceleration time T2 at which the loss limit VG is only just observed. In practice, however, it is advantageous to vary the process torque M1 and/or the machining time T1 within certain limits and to determine the respectively associated achievable acceleration time T2, for values around the specified process torque M1 and/or the specified machining time T1 therefore.

In a step S86, the computing facility 10 offers the determined combinations of acceleration times T2, process torques M1 and machining times T1—the admissible combinations therefore—to the operator 13 for selection. In a step S87, the computing facility 10 receives a selection of such a combination from the operator 13. In a step S88, the computing facility 10 then determines, on the basis of the selection of the operator 13, the limit values IM, PM, MM, aM to be observed. Steps S86 to S88 in FIG. 11 correspond to steps S76 to S78 in FIG. 10.

To summarize: the present invention thus relates to the following facts:

In normal operation, during an acceleration time T2, a numerical control 3 iteratively accelerates a spindle 6 by means of a spindle drive 7 and during a subsequent machining time T1, machines a workpiece 5 by means of a respective tool 4 held in the spindle 6. The spindle drive 7 rotates the tool 4 during the machining time T1 at an operating speed nA and loads it with a process torque M1. The spindle drive 7 has a converter 9, which supplies a drive motor 8 of the spindle drive 7 with current. Before normal operation, limit values IM, PM, MM, aM to be observed by the numerical control 3 and the spindle drive 7 during the course of a workflow are determined in a computing facility 10 coupled to the numerical control 3, and are transmitted to the numerical control 3 and the converter 9. The computing facility 10 transmits a command to the numerical control 3 to briefly actuate the spindle drive 7, receives an associated loading of the spindle drive 7 with a drive torque and data about an associated prompted acceleration of the spindle 6 from the numerical control 3 and determines from this a moment of inertia Θ of the spindle 6, including the spindle drive 7. The computing facility 10 retrieves parameters P from the converter 9, which parameters describe the maximum possible operating limits of the converter 9, and motor data D of the drive motor 8, from which the maximum possible torque of the spindle drive 7 can be determined as a function of the speed of the drive motor 8. The computing facility 10 receives process data PD from an operator 13, which data comprises at least the process torque M1. By considering the operating speed nA, a resulting moment of inertia ΘR determined by considering the moment of inertia Θ of the spindle 6, including the spindle drive 7, the parameters P and the motor data D and the process data PD for possible acceleration times T2, the computing facility 10 determines the associated necessary currents and torques and the thermal losses V2 that occur in the spindle drive 7 in this connection and the thermal losses V1 that occur in the spindle drive 7 in this connection for possible process torques M1. The computing facility 10 determines combinations of acceleration times T2, process torques M1 and machining times T1 whose mean thermal losses VM do not overshoot a predetermined loss limit VG, offers the determined combinations to the operator 13 for selection, receives a selection of such a combination from the operator 13 and, on the basis of this selection, determines the limit values IM, PM, MM, aM to be observed.

The present invention has many advantages. In particular, owing to the inventive, guided workflow, the limit values IM, PM, MM, aM to be observed can also be optimized by an operator 13 who is not an expert by considering the alternating sequence of acceleration times T2 and machining times T1. The present restrictions, which have to be considered when operating the spindle 6 and the spindle drive 7, can be read from the numerical control 3 and the converter 9 and be considered when determining the limit values IM, PM, MM, aM to be observed. The torque characteristic curve can be determined from the parameters P and motor data D stored in the converter 9. Overloading of the spindle 6 and of the spindle drive 7 (including the drive motor 8 and the converter 9) can be reliably avoided. The inventive parameterization method is particularly advantageous when the operating speed nA has a large value, so the acceleration time T2 is also correspondingly high.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for parameterizing a numerical control, comprising:

in normal operation, iteratively accelerating with the numerical control by way of a spindle drive, which comprises a drive motor supplied with current from a converter and generating a torque, during an acceleration time a spindle of a machine tool controlled by the numerical control and machining a workpiece during a machining time by way of a tool held in the spindle, with the spindle drive during the machining time rotating the tool at an operating speed and applying a process torque;

before implementing the normal operation, determining in a computing facility coupled to the numerical control limit values to be observed by the numerical control and the spindle drive while executing a workflow and transmitting the limit values from the computing facility to the numerical control and to the converter; and with the computing facility, when executing the workflow, transmitting a command to the numerical control to briefly actuate the spindle drive, during the brief actuation, receiving from the numerical control a drive torque applied to the spindle drive and data relating to an acceleration of the spindle caused by the brief actuation, determining from the data a moment of inertia of the spindle and of the spindle drive, retrieving from the converter either directly or via the numerical control parameters that describe maximum operating limits of the converter, retrieving from the converter either directly or via the numerical control motor data of the drive motor that allow determination of a maximum torque of the spindle drive as a function of the speed of the drive motor, receiving from an operator process data comprising at least the process torque, determining by considering the operating speed, a resulting moment of inertia determined from the moment of inertia of the spindle and of the spindle drive, the parameters and the motor data retrieved from the converter and the process data for possible acceleration times, required currents and torques and associated thermal losses in the spindle drive and thermal losses in the spindle drive associated with the process torque, determining combinations of the acceleration times, the process torque and machining times where average thermal losses do not exceed a predetermined loss limit, offering the operator as selections the determined combinations of the acceleration times, the process torque and the machining times and receiving from the operator a particular selection from the determined combinations, and based on the particular selection received from the operator, determining the limit values to be observed by the numerical control and the spindle drive.

2. The method of claim 1, wherein the limit values to be observed by the numerical control and the spindle drive comprise a maximum current and a maximum power supplied by the converter to the drive motor, or a maximum torque applied by the spindle drive and a maximum acceleration of the spindle drive, or both.

3. The method of claim 1, wherein the parameters retrieved by the computing facility from the converter comprise at least one of a current limit of the semiconductor switches, a power limit of the converter, a torque limit of the spindle drive, a torque limit of the spindle and a conversion factor used to convert a motor current fed by the converter to the spindle drive into a torque acting on the spindle drive.

4. The method of claim 1, wherein the motor data comprise at least one of a type of the drive motor, a nominal speed and a design torque of the drive motor.

5. The method of claim 1, wherein during determination of the possible acceleration times, the computing facility also considers a friction that occurs in the spindle.

6. The method of claim 5, wherein characteristic data of the friction that occurs in the spindle are specified to the computing facility by the operator or the computing facility determines the characteristic data of the friction that occurs in the spindle based on the measured operating data of the spindle.

7. The method of claim 1, wherein the computing facility receives inertia-relevant variables from the operator, which the computing facility considers in addition to the moment of inertia of the spindle and of the spindle drive when determining a resulting moment of inertia.

8. The method of claim 1, wherein the process data further comprise the machining time, and wherein for values about the process torque or the machining time, the computing facility determines an achievable acceleration time and outputs the achievable acceleration time to the operator.

9. The method of claim 1, wherein the process data do not comprise the machining time and wherein the computing facility determines and outputs to the operator a minimum possible acceleration time and a minimum necessary machining time associated with the minimum possible acceleration time as a function of the actual process torque, or determines and outputs to the operator a maximum permissible process torque as a function of the machining time.

10. A computer program, comprising machine code stored on a non-volatile computer-readable medium, which when read into a memory of a computing facility coupled to a numerical control and executed by a processor of the computing facility, causes the numerical control to carry out a method as set forth in claim 1.

11. A computing facility coupled a numerical control and programmed to execute a computer program as set forth in claim 10.

* * * * *